(12) United States Patent
Sunaga

(10) Patent No.: US 7,212,353 B2
(45) Date of Patent: May 1, 2007

(54) OPTICAL ELEMENT, OPTICAL SYSTEM, AND OPTICAL DEVICE

(75) Inventor: Toshihiro Sunaga, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/095,067

(22) Filed: Mar. 31, 2005

(65) Prior Publication Data
US 2006/0082903 A1   Apr. 20, 2006

(30) Foreign Application Priority Data
Mar. 31, 2004   (JP)   .............................. 2004-108391

(51) Int. Cl.
*G02B 17/00* (2006.01)
(52) U.S. Cl. ........................ 359/726; 359/834
(58) Field of Classification Search ......... 359/729–732
See application file for complete search history.

(56) References Cited

U.S. PATENT DOCUMENTS

| | | | | |
|---|---|---|---|---|
| 2,472,600 | A * | 6/1949 | Luboshez .................... | 359/638 |
| 5,825,560 | A | 10/1998 | Ogura et al. ................ | 359/822 |
| 5,847,887 | A | 12/1998 | Ogura et al. ................ | 359/822 |
| 5,936,773 | A | 8/1999 | Togino ........................ | 359/630 |
| 6,021,004 | A | 2/2000 | Sekita et al. ................ | 359/676 |
| 6,078,411 | A | 6/2000 | Aoki ........................... | 359/631 |
| 6,166,866 | A | 12/2000 | Kimura et al. .............. | 359/729 |
| 6,208,468 | B1 | 3/2001 | Togino et al. ............... | 359/637 |
| 6,252,721 | B1 | 6/2001 | Ito | |
| 6,268,963 | B1 | 7/2001 | Akiyama .................... | 359/631 |
| 6,292,309 | B1 | 9/2001 | Sekita et al. ................ | 359/729 |
| 6,323,892 | B1 | 11/2001 | Mihara ....................... | 348/14.01 |
| 6,366,411 | B1 | 4/2002 | Kimura et al. .............. | 359/729 |
| 6,404,556 | B1 | 6/2002 | Kobayashi | |
| 6,437,925 | B1 | 8/2002 | Nishioka .................... | 359/726 |
| 6,464,363 | B1 | 10/2002 | Nishioka et al. ............ | 359/846 |

(Continued)

FOREIGN PATENT DOCUMENTS

EP    1312968    11/2002

(Continued)

OTHER PUBLICATIONS

Communication from European Patent Office dated Aug. 4, 2006.

*Primary Examiner*—Scott J. Sugarman
*Assistant Examiner*—Darryl J. Collins
(74) *Attorney, Agent, or Firm*—Morgan & Finnegan, L.L.P.

(57) ABSTRACT

Provided is a compact optical element that secures an optical path length and improves manufacturing precision economically. The optical element includes a transparent member having a first and second refracting surface, and reflecting surfaces. Light entering the transparent member from the first refracting surface is reflected by the reflecting surfaces to the second refracting surface. An optical path from the first to second refracting surface crosses itself inside the transparent member seen from a direction perpendicular to light entering the first refracting surface and exiting the second refracting surface. The transparent member guides the incident light from the first to the second refracting surface while reflecting the light alternately by at least one first and one second reflecting surface is in a first and second region respectively. The first and second regions and, respectively, are on opposite sides of a plane passing through the transparent member taken as a boundary.

20 Claims, 8 Drawing Sheets

U.S. PATENT DOCUMENTS

| | | | |
|---|---|---|---|
| 6,466,383 B1 | 10/2002 | Miyajima et al. | 359/831 |
| 6,545,810 B1 | 4/2003 | Togino et al. | 359/618 |
| 6,552,854 B2 | 4/2003 | Kuramochi et al. | 359/627 |
| 6,876,502 B2 * | 4/2005 | Kim | 359/719 |
| 2001/0009477 A1 | 7/2001 | Uchara et al. | |
| 2002/0018185 A1 | 2/2002 | Kuramochi et al. | 353/69 |
| 2002/0181126 A1 | 12/2002 | Nishioka | 359/726 |
| 2003/0035232 A1 | 2/2003 | Sasaki | 359/859 |
| 2003/0063400 A1 | 4/2003 | Sunaga et al. | 359/861 |
| 2003/0076606 A1 | 4/2003 | Ooki | 359/857 |
| 2003/0107816 A1 | 6/2003 | Takagi et al. | 359/631 |

FOREIGN PATENT DOCUMENTS

| | | |
|---|---|---|
| JP | 29 9-005650 | 1/1997 |
| JP | 10-11525 | 1/1998 |
| JP | 10-307260 | 11/1998 |
| JP | 10-333040 | 12/1998 |
| JP | 11-23971 | 1/1999 |
| JP | 11-23972 | 1/1999 |
| JP | 11-64734 | 3/1999 |
| JP | 11-242165 | 9/1999 |
| JP | 11-317894 | 11/1999 |
| JP | 11-317895 | 11/1999 |
| JP | 2000-56226 | 2/2000 |
| JP | 2000-81573 | 3/2000 |
| JP | 2000-267010 | 9/2000 |
| JP | 2000-298237 | 10/2000 |
| JP | 2001-051197 | 2/2001 |
| JP | 2001-100101 | 4/2001 |
| JP | 2001-201622 | 7/2001 |
| JP | 2001-208905 | 8/2001 |
| JP | 2001-311905 | 11/2001 |
| JP | 2003-5074 | 1/2003 |
| JP | 2003-43360 | 2/2003 |
| JP | 2003-57549 | 2/2003 |
| JP | 2003-149587 | 5/2003 |
| JP | 2003-149588 | 5/2003 |
| JP | 2003-149589 | 5/2003 |
| JP | 2003-149590 | 5/2003 |
| JP | 2003-149591 | 5/2003 |
| JP | 2003-149592 | 5/2003 |
| JP | 2003-149593 | 5/2003 |
| WO | WO 99/41631 | 8/1999 |

* cited by examiner

OPTICAL ELEMENT, OPTICAL SYSTEM, AND OPTICAL DEVICE

BACKGROUND OF THE INVENTION

1. Field of the Invention

The present invention relates to an optical element and to an optical system used in a variety of optical devices, such as video cameras, still cameras, portable device cameras, and other image pickup apparatuses, and head mounted displays, projectors, and other display devices.

2. Related Background Art

Design methods and design examples for sufficiently correcting aberrations in a decentered optical system by introducing an idea referred to as a reference axis, and making a constituent surface of the optical system into an asymmetric non-spherical surface, are disclosed in U.S. Pat. No. 5,825,560, U.S. Pat. No. 5,847,887, U.S. Pat. No. 6,021,004, U.S. Pat. No. 6,166,866, U.S. Pat. No. 6,292,309, U.S. Pat. No. 6,366,411, and the like.

The decentered optical system is referred to as an off axial optical system. Consider the reference axis across a light ray that passes through the center of an image and the center of a pupil. The decentered optical system is defined as an optical system that contains a curved surface (off axial curved surface) where a surface normal at an intersection between the reference axis and the constituent surface is not on the reference axis. The reference axis takes on a bent shape in the off axial optical system.

The constituent surface generally becomes decentered in the off axial optical system, and vignetting does not develop even in a reflecting surface. It is thus easy to build the optical system that uses the reflecting surface. Further, the optical path can be relatively freely drawn around, and it is easy to make an integrated optical system by using the method of integrally forming the constituent surface. Accordingly, reflecting optical elements that are compact, freely shapeable, and that utilize space efficiently can be configured.

Further, U.S. Pat. No. 6,268,963 and U.S. Pat. No. 2003-063400 disclose compactly structured optical prisms that secure a sufficient optical path length by making the optical path. (reference axis) cross itself in an inner portion of the optical prism.

However, for cases where the number of reflecting surfaces of the optical prism increases due to a reason such as correcting aberrations in the optical prism, the influence of errors during manufacture of each reflecting surface, such as surface shape errors or surface peculiarities, accumulates. The tolerances in error in each of the reflecting surfaces become smaller and more severe as the number of reflecting surfaces increases. Accordingly, high precision must be secured for the surface shape of each of the reflective surfaces.

The manufacture of such optical prisms has been carried out using metallic molds in recent years mainly due to the demand for lower manufacturing costs. Further, it is necessary to provide a projecting portion to both sides of an optical element, and hold the optical element by a holding member using the projecting portions or the like when the optical element is attached to an actual optical device. However, the projecting portions are generally formed in split portions of a mold that has been split into two pieces.

FIG. 8 shows a reflecting optical element P disclosed in U.S. Pat. No. 2003-063400. Further, FIG. 9 shows optical surfaces R11 to R15 of the optical element P of FIG. 8, a center principal light ray (reference axis) PR, and normals RV1 to RV5 to the optical surfaces R11 to R15, respectively. The normals RV1 to RV5 of the optical surfaces R11 to R15 extend in mutually different directions.

FIG. 10 is a schematic diagram that shows a state where the optical element P of FIG. 8 is formed by a metallic mold that is split into two pieces. In FIG. 10, the metallic mold is split in the Y-direction shown in FIG. 8, and the mold is opened in the Y direction after the optical element P is formed. Symbol UM here denotes an upper mold, and symbol DM denotes a lower mold.

Referring to FIG. 11, mold surfaces RM11 and RM12, which correspond to the optical surfaces R11 and R12, respectively, are either substantially parallel to, or inclined at a steep angle with respect to, a direction in which the mold opens (the Y direction). The optical element P consequently tends to deform during removal from the mold.

Further, FIG. 12 shows a state when the mold surfaces RM11 and RM12 are machined when manufacturing the upper mold UM. Symbol B here denotes a cutting tool that is attached to a cutting machine. The cutting tool B is normally brought into contact with mold surfaces from a direction normal to the surfaces during manufacture of the mold. However, as can be understood from FIG. 12, a position of the cutting tool B when cutting the wall RM11 differs from a position of the cutting tool B when cutting the surface RM12 by an angle of nearly 180° C. However, normal cutting machines cannot handle such a large change in the position of the cutting tool. Rather, it is only possible for the cutting machines to change the cutting tool position by an angle on the order of 80° to 120° at most. Further, the smaller the gap between the surface RM11 and the surface RM12, the more difficult it becomes for the cutting tool B itself to enter between the surface RM11 and the surface RM12. Accordingly, it becomes impossible for the cutting tool B to perform cutting.

Considering the deformation upon removal from the mold, the machining of the mold, and the like, it is preferable that the angle between the normals of the optical surfaces and the directions in which the mold is removed be small.

Problems such as these are more or less resolved by splitting the mold into three or four pieces instead of two. However, it becomes more difficult to maintain positional precision of the mold pieces when the mold is split into three or four pieces, and the mold is thus not suited for forming a reflective surface for which higher precision is required than that of a light transmitting surface. In addition, the structure of a molding apparatus becomes more complex compared to that used when the mold is split into two pieces. This leads to higher costs.

In other words, the parting plane of the mold must be designed carefully in order to manufacture the optical element such as that-described above in which the reference axis crosses itself in the inner portion of the optical element. The same applies to the optical element disclosed in U.S. Pat. No. 6,268,963.

SUMMARY OF THE INVENTION

An object of the present invention is to provide an optical element, and an optical system that uses the optical element, that are compact, capable of securing an optical path length, and with which manufacturing precision can be improved without inviting cost increases.

To attain the above object, according to one aspect of the present invention, there is provided an optical element including a transparent member having: a first refracting surface; a second refracting surface; and a plurality of reflecting surfaces, wherein the transparent member is capable of causing light, which enters the transparent member from the first refracting surface, to be reflected by the plurality of reflecting surfaces and guided to the second refracting surface, wherein an optical path from the first refracting surface leading to the second refracting surface crosses itself inside the transparent member when seen from a direction that is substantially perpendicular to both incident light on the first refracting surface and light exiting from the second refracting surface, and wherein the transparent member is capable of guiding the incident light from the first refracting surface to the second refracting surface while reflecting the incident light alternately by at least one first reflecting surface and at least one second reflecting surface, the at least one first reflecting surface being at least one reflecting surface of the plurality of reflecting surfaces which is disposed within a first region, the at least one second reflecting surface being at least one reflecting surface of the plurality of reflecting surfaces which is disposed within a second region, the first region and the second region being regions on one and the other sides, respectively, of a first plane passing through the transparent member which is taken as a boundary.

To attain the above object, according to another aspect of the present invention, there is provided an optical system including an optical element having: a first refracting surface; a second refracting surface; and a plurality of reflecting surfaces, wherein the optical element is configured such that a center principal light ray that passes from the center of an object plane to the center of a pupil enters the optical element from the first refracting surface, is reflected by the plurality of reflecting surfaces, and then exits from the optical element through the second refracting surface, wherein an optical path of the center principal light ray from the first refracting-surface leading to the second refracting surface crosses itself inside the optical element when seen from a direction that is approximately perpendicular to both the center principal light ray incident from the first refracting surface and the center principal light ray directing to the second refracting surface, and wherein the optical element guides the center principal light ray from the first refracting surface to the second refracting surface while reflecting the center principal light ray alternately by at least one first reflecting surface and at least one second reflecting surface, the at least one first reflecting surface being at least one reflecting surface of the plurality of reflecting surfaces which is disposed within a first region, the at least one second reflecting surface being at least one reflecting surface of the plurality of reflecting surfaces which is disposed within a second region, the first region and the second region being regions on one and the other sides, respectively, of a first plane passing through the optical element which is taken as a boundary.

DESCRIPTION OF THE PREFERRED EMBODIMENTS

Embodiments of the present invention are explained below while referring to the appended drawings.

First Embodiment

Figure 1:
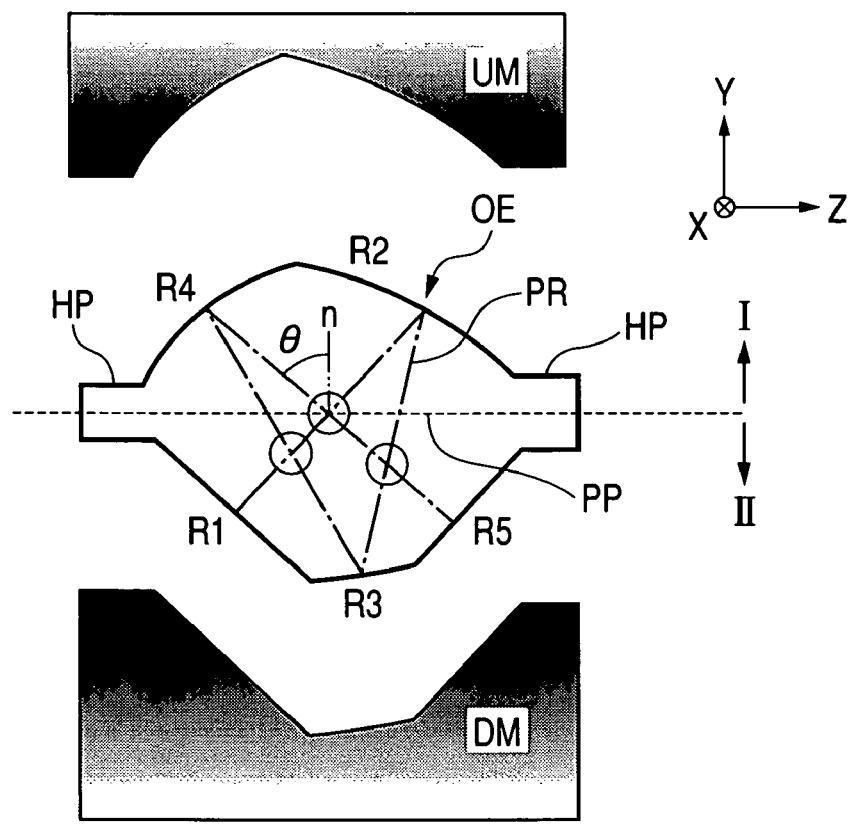
FIG. 1 is a cross sectional view that shows a configuration of an optical element of First Embodiment of the present invention, and an arrangement of a mold for forming the optical element.

FIG. 1 shows an optical element according to First Embodiment of the present invention, and a mold used to form the optical element. In other words, FIG. 1 shows a sectional view in YZ plane, of an optical element OE according to the present invention (i.e., a view when seen from a direction approximately perpendicular to both a light incident into the optical element OE and a light emerged from the optical element OE). More particularly, in the optical system using the optical element OE, when the light ray passing through the canter of the object surface and the center of the pupil of the optical system is assumed as a center principal light ray, FIG. 1 is the view seen from a direction approximately perpendicular (preferably a direction substantially perpendicular) to both a centre principal light ray incident (immediately before incidence) into a incident side refractive surface R1 of the optical element OE and a center principal light ray emerged (immediately after emergence) from the emergence side refractive surface R5, or both a centre principal light ray incident (immediately after incidence) from a incident side refractive surface R1 of the optical element OE and a center principal light ray emerged (immediately before emergence) into the emergence side refractive surface R5. Symbol OE in FIG. 1 denotes the optical element, and symbol PP denotes a parting plane between an upper mold UM and a lower mold DM. Further, symbol HP denotes projecting portions that become references for holding the optical element OE by using a holding member described later. The projecting portions HP are formed in a flat shape or in a rectangular parallelepiped shape on both left and right sides of the optical element OE. The projecting portions HP are formed integrally with the optical element OE in the vicinity of the parting plane PP of the upper mold UM and the lower mold DM.

The parting plane PP here is not a surface that actually exists after the optical element OE is formed, but rather is an imaginary plane. In this embodiment the parting plane PP is defined as a plane (first plane) that passes through the two projecting portions HP formed on both sides of the optical element OE.

Optical surfaces R1, R3, and R5 of the optical element OE are formed by the lower mold DM, while optical surfaces R2 and R4 are formed by the upper mold UM. The optical surfaces R1 and R5 are transmitting surfaces here (may be refraction surfaces or diffraction surfaces, and of course may be planar surfaces). The other optical surfaces R2 to R4 are inner portion reflecting surfaces. It should be noted that the optical surfaces R2 to R4 may be planar surfaces, and may also possess curvature. Furthermore, the optical surfaces R2 to R4 may be rotationally symmetric surfaces, and may be rotationally non-symmetric surfaces.

Further, symbol PR in FIG. 1 denotes a center principal light ray. The center principal light ray in this embodiment refers to a light ray that leads from the center of an object surface to the center of a pupil, through each of the optical surfaces, when the optical element is disposed within an optical system. When the optical system is an off axial optical system, a pathway followed by the center principal light ray becomes a reference axis.

The center principal light ray PR emitted from an object surface (not shown) first enters the optical element OE from the transmitting surface R1, and is led to the transmitting surface R5 through the reflecting surfaces R2, R3, and R4. The center principal light ray PR is then emitted from the transmitting surface R5 to a portion outside of the optical element OE.

As is clear from FIG. 1, the center principal light ray PR crosses itself (i.e., crosses its reflected ray) at three locations within the optical element OE (locations enclosed by circles in FIG. 1). The center principal light ray can cross itself at four or more locations within the optical element OE, and can cross itself at two locations, but it is preferable that the center principal light ray crosses at three to five locations. It suffices that the crossings be seen to occur as viewed from the direction of FIG. 1. In other words, it is sufficient for the center principal light ray to cross itself within the optical element (transparent member) OE as seen from a direction substantially perpendicular to both the center principal light ray (reference axis) entering from the optical surface R1 and the center principal light ray (reference axis) that exits from the optical surface R5 (seen as in FIG. 1). It is of course even more preferable if the crossings actually take place, and such actual crossings occur in this embodiment.

Further, the parting plane PP is always cut across when the center principal light ray heads from the transmitting surface R1 toward the reflecting surface R2, when the center principal light ray heads from the reflecting surface R2 toward the reflecting surface R3, when the center principal light ray heads from the reflecting surface R3 toward the reflecting surface R4, and when the center principal light ray heads from the reflecting surface R4 toward the transmitting surface R5.

In other words, with the parting plane PP as a boundary, when an upper side region is taken as a first region I, and a lower side region is taken as a second region II, the reflecting surfaces R2 to R4 are arranged alternately in the first region I and the second region II in the order in which the center principal light ray PR proceeds. It should be noted that, in this embodiment, all of the optical surfaces, including the transmitting surfaces R1 and R5, are arranged alternately in the first region I and the second region II in the order in which the center principal light ray PR proceeds.

Figure 8:
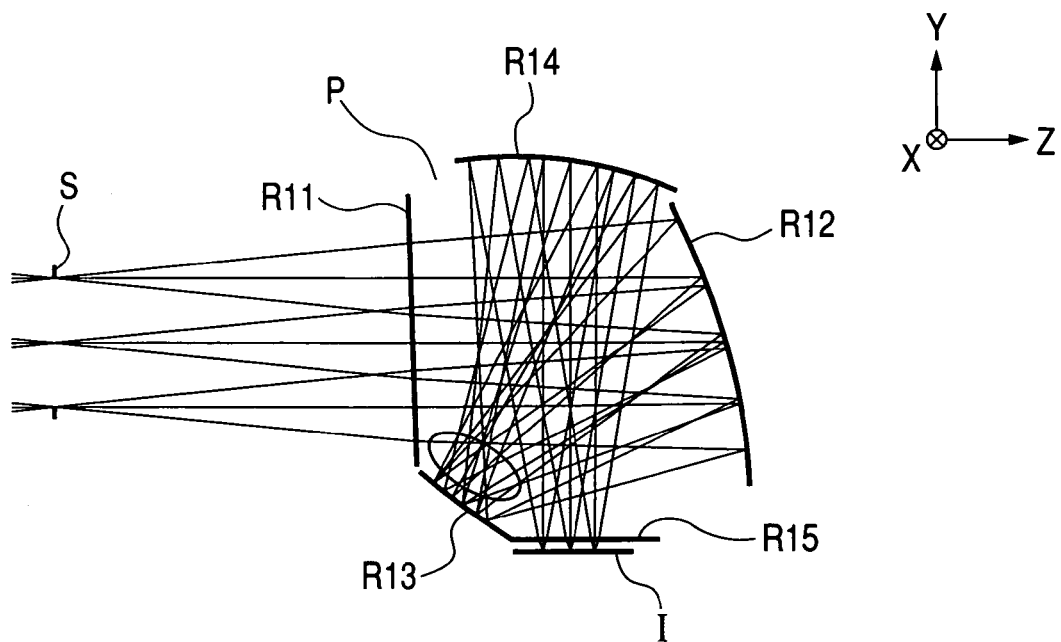
FIG. 8 is a cross sectional view of a conventional optical element.
Figure 9:
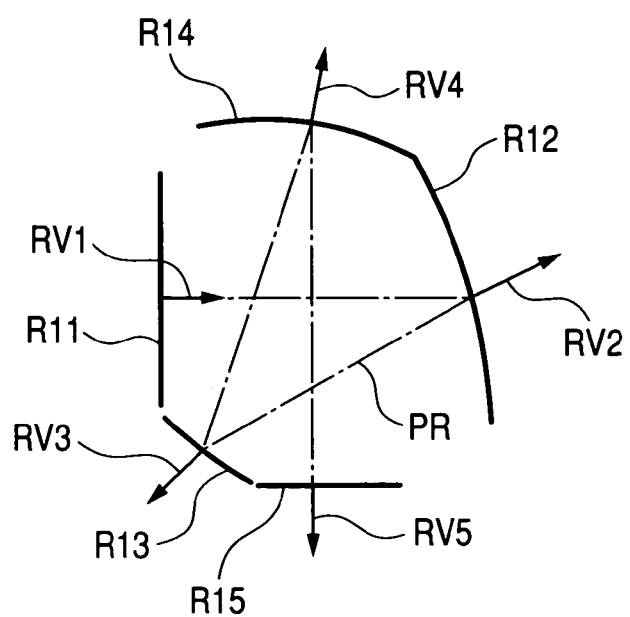
FIG. 9 is a diagram that shows optical surfaces of a conventional optical element and normals to the optical surfaces.
Figure 10:
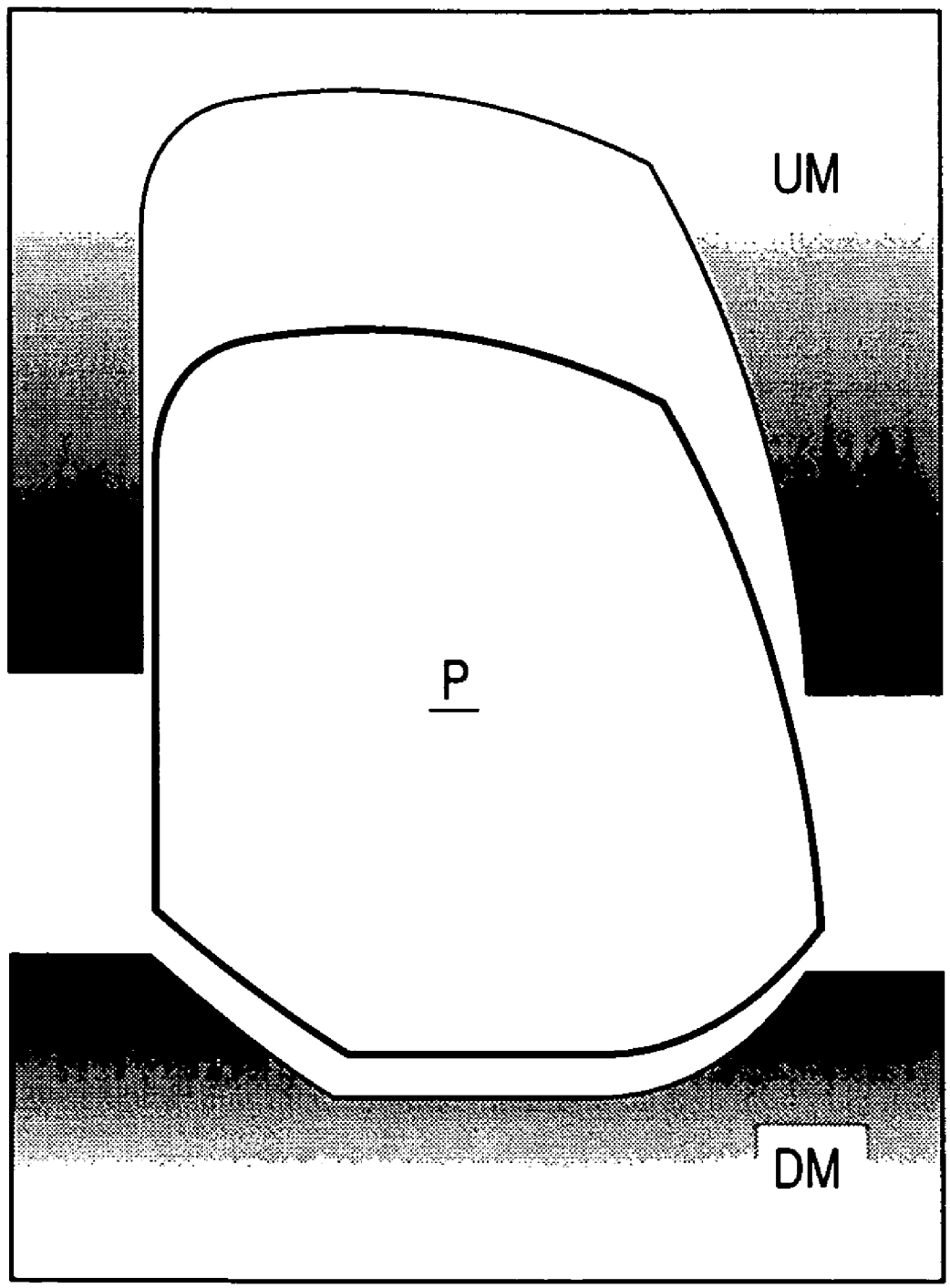
FIG. 10 is a diagram that shows an arrangement of a mold for forming a conventional element.
Figure 11:
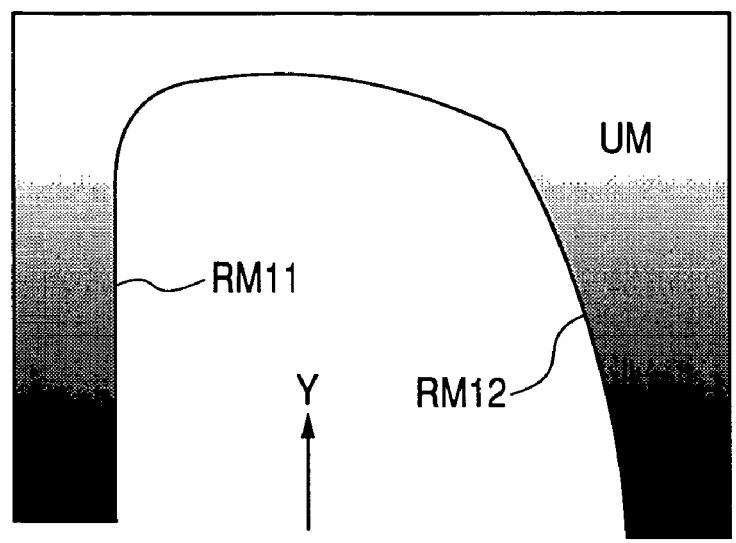
FIG. 11 is a diagram that shows an upper mold for forming a conventional optical element.
Figure 12:
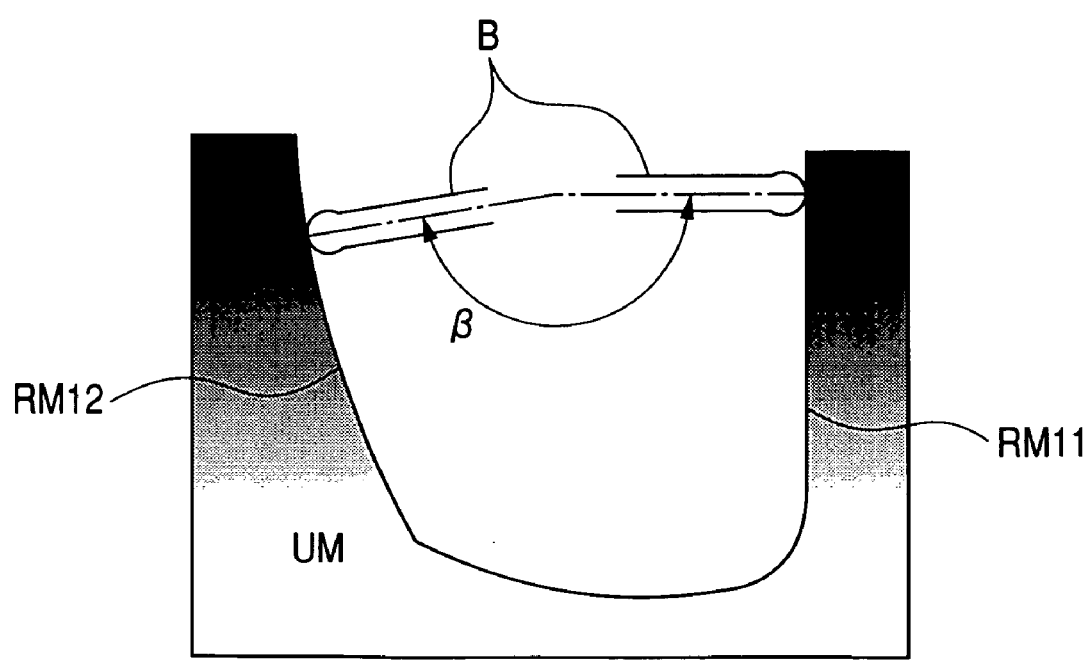
FIG. 12 is a schematic diagram during a process of cutting a mold for forming a conventional optical element.

By employing this type of optical surface arrangement, the angle between the surface normal of each of the optical surfaces and the direction in which the upper mold UM and the lower mold DM open (the direction in which the mold is split, which is the Y direction in the figures) become small compared to that of a conventional optical element explained by FIG. 8 to FIG. 10.

Figure 2A:
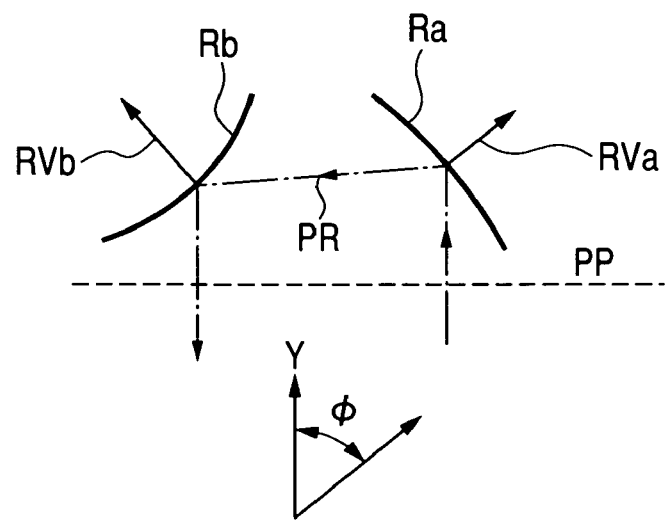
FIG. 2A is a diagram that shows a relationship between normals of optical surfaces of the optical element, light rays, and propagation of the light rays.
Figure 2B:
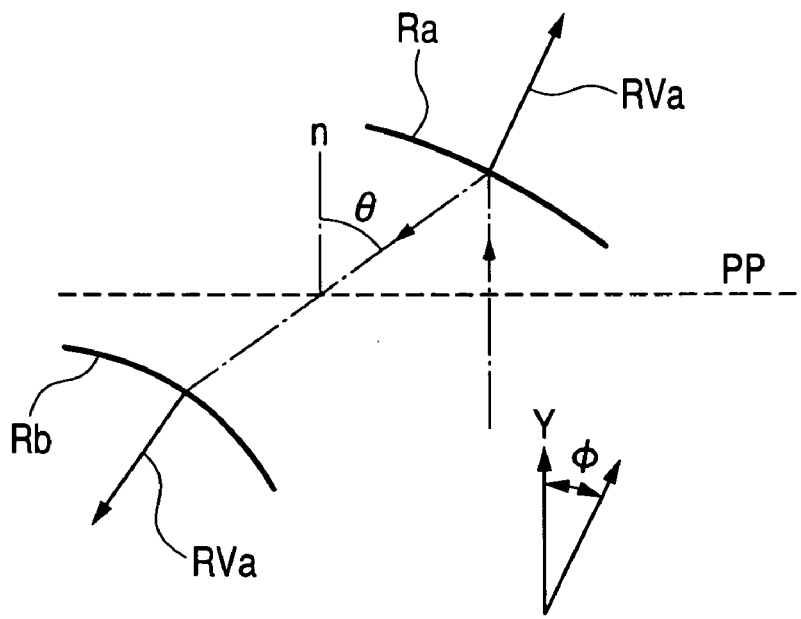
FIG. 2B is a diagram that shows a relationship between normals of optical surfaces of the optical element, the light rays, and propagation of the light rays.

FIG. 2A shows a state where the center principal optical ray PR reflected by a reflecting surface Ra heads toward a next reflecting surface Rb without cutting across the parting plane PP. Further, FIG. 2B shows a state where the center principal light ray PR reflected by the reflecting surface Ra heads toward the next reflecting surface Rb after the center principal light ray PR cuts across the parting plane PP. Symbol φ denotes an angle made between a surface normal RVa of the reflecting surface Ra and the direction in which the mold opens (the Y direction). Furthermore, symbol RVb denotes a surface normal of the reflection surface Rb.

As it becomes clear from the figures, Φ becomes smaller when the center principal light axis PR, which proceeds from the reflecting surface Ra toward the reflecting surface Rb, cuts across the parting plane PP, as FIG. 2B shows. This is because, when the reflecting surface Ra of FIG. 2A is inclined so that the normal RVa points further upward, the reflecting surface Rb becomes situated lower than the parting plane PP. In other words, as shown in FIG. 1, the angle between the surface normal of the reflecting surface and the direction in which the mold opens becomes smaller provided that the center principal light ray PR is configured to always cut across the parting plane PP, that is, to always cut across the plane passing between the two projecting portions HP, when the center principal light ray PR heads from one reflecting surface toward the next reflecting surface. In this embodiment this can also be said between the transmitting surface R1 and the next reflecting surface R2, and between the reflecting surface R4 and the next transmitting surface R5.

Figure 2C:
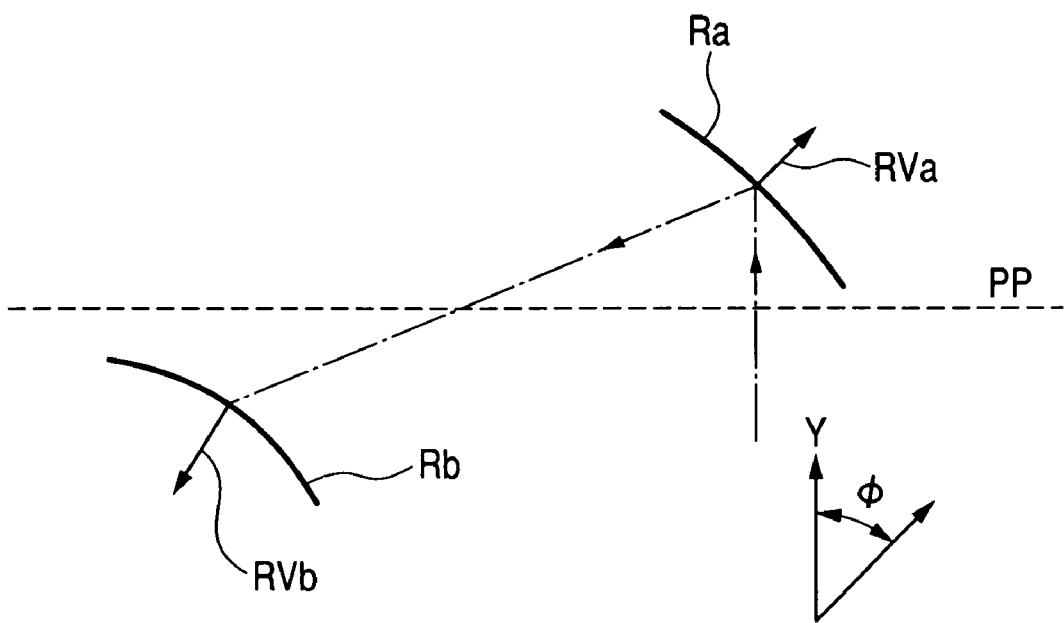
FIG. 2C is a diagram that shows a relationship between normals of optical surfaces of the optical element, the light rays, and propagation of the light rays.

On the other hand, FIG. 2C shows a case where the reflecting surface Rb shown in FIG. 2B is shifted in a direction parallel to the parting plane PP (away from the reflecting surface Ra). Compared to FIG. 2B, the angle φ becomes larger. In other words, the angle φ becomes larger when the spacing between the reflecting surfaces becomes larger. Accordingly, it is necessary to determine the parting plane PP so that angles between a surface normal of an optical surface disposed at one endmost portion in the direction along the parting plane PP in the first region I, that is, in the transverse direction, a surface normal of an optical surface disposed at the other endmost portion in the transverse direction in the second region II (hereinafter those optical surfaces are referred to as the "endmost optical surfaces"), and the direction in which the mold opens become smaller.

In this embodiment, the "endmost optical surfaces" are the reflecting surface R4, which is the closest to the projecting portion HP on the left side in the first region I, and the transmitting surface R5, which is the closest to the projecting portion HP on the right side in the second region II. The spacing between the reflecting surface R4 and the transmitting surface R5 is the longest in the optical element OE. Further, the transmitting surface R1, which is the closest to the projecting portion HP on the left side in the second region II, and the reflecting surface R2, which is the closest to the projecting portion HP on the right side in the first region I, also correspond to the "endmost optical surfaces."

The reflecting surface R4 and the transmitting surface R5 will be explained below. Gradients (inclinations) of the mold opening direction to the surface normals of the reflecting surface R4 and the transmitting surface R5 are roughly determined by an angle θ between a normal n of the parting plane PP and the center principal light ray PR from the reflecting surface R4 toward the transmitting surface R5, or between the normal n and a straight line that connects a surface apex point of the reflecting surface R4 and a surface apex point of the transmitting surface R5.

When the center principal light ray crosses itself within the optical element OE, the center principal light ray travels from the optical surfaces at both ends of the optical element OE toward the inside of the optical element OE. Restrictions imposed on the angles formed between the normals and the direction in which the mold opens can thus be somewhat loosened. Specifically, the restrictions can be loosened by an amount on the order of 10°. It is preferable that the angles formed between the normals and the direction in which the mold opens be 60° or smaller, more preferably 40° or smaller, for ease of opening the mold and for ease in a cutting process used to make the mold. In order to satisfy this condition, it is preferable that the angle θ be set to 70° or smaller, more preferably to 50° or smaller.

It should be noted that it is preferable that the condition for the angle θ also be met between the transmitting surface R1 and the reflecting surface R2.

Figure 3:
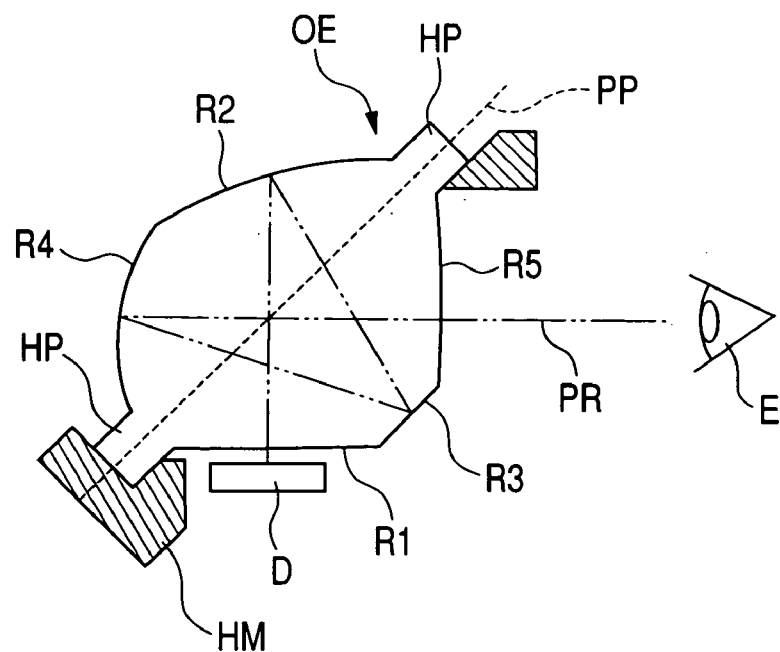
FIG. 3 is a cross sectional view that shows a configuration of an optical system that uses the optical element of First Embodiment.

FIG. 3 shows a state where the optical element OE is applied to an electronic finder of an image pickup device such as a video camera, or an observation optical system used in a display device such as a head mounted display.

Symbol HM in FIG. 3 denotes a holding member that holds the optical element OE by using the projecting portions HP. The holding member is provided integrally with a device main body, and fixed thereto. Specific surfaces of the projecting portions HP are taken as reference surfaces. By contacting the reference surfaces against reference surfaces of the holding member HM, and then bonding the reference surfaces of the projecting portions HP to the reference surfaces of the holding member HM using an adhesive (not shown), the optical element OE is positioned and held by the holding member HM.

Further, symbol D in FIG. 3 denotes an image display element made from a liquid crystal element, a self light emitting element, or the like. Light from the image display element D is incident to the optical element OE form the transmitting surface R1. After being reflected by the reflecting surfaces R2 to R4, the light is emitted from the transmitting surface R5 and is guided to a pupil E of an observer.

Figure 4:
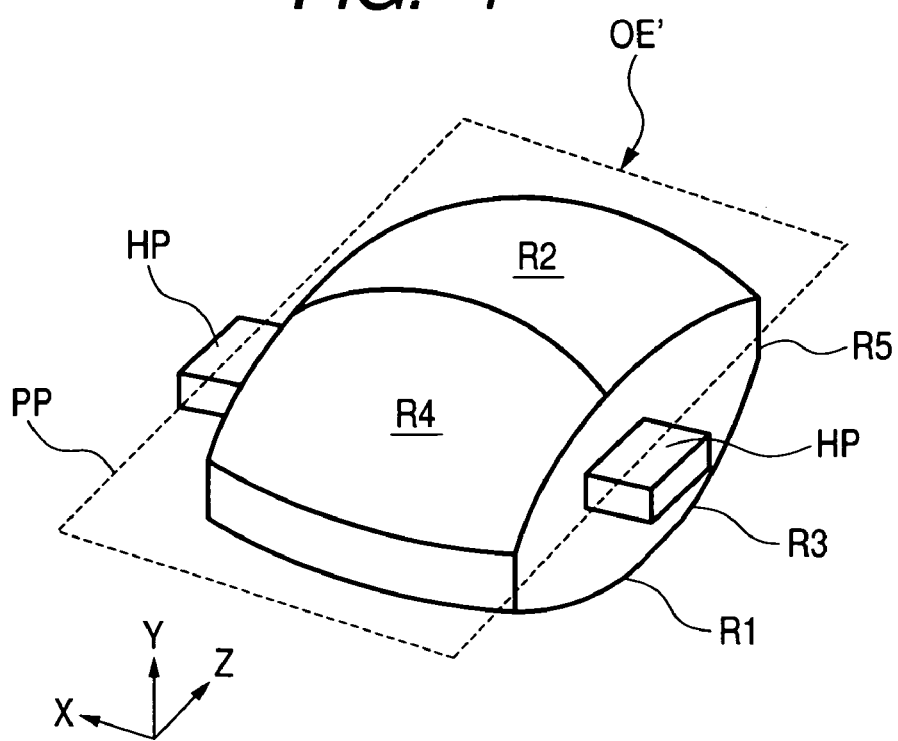
FIG. 4 is a perspective view that shows a configuration of a modification of the optical element of First Embodiment.

It should be noted that, although a case where the projecting portions HP are provided on both ends in a left and right direction (Z direction) of FIG. 1 is explained in the embodiment described above, the projecting portions HP may also be provided at both ends in an X direction like an optical element OE' in FIG. 4. In this case as well, setting (definition) of the parting plane PP, conditions that should be satisfied for arranging the plurality of reflecting surfaces R1 to R4, and conditions that the angle θ should satisfy are all similar to those of the embodiment shown in FIG. 1.

Further, although a case of forming the projecting portions HP in a flat plate shape or in a parallelepiped shape is explained in the embodiment described above, the shape of the projecting portions is not limited to these shapes. For example, the projecting portions may also be formed in a cubic shape, a-substantially cylindrical shape having a flat surface on a portion thereof, or the like.

Figure 5:
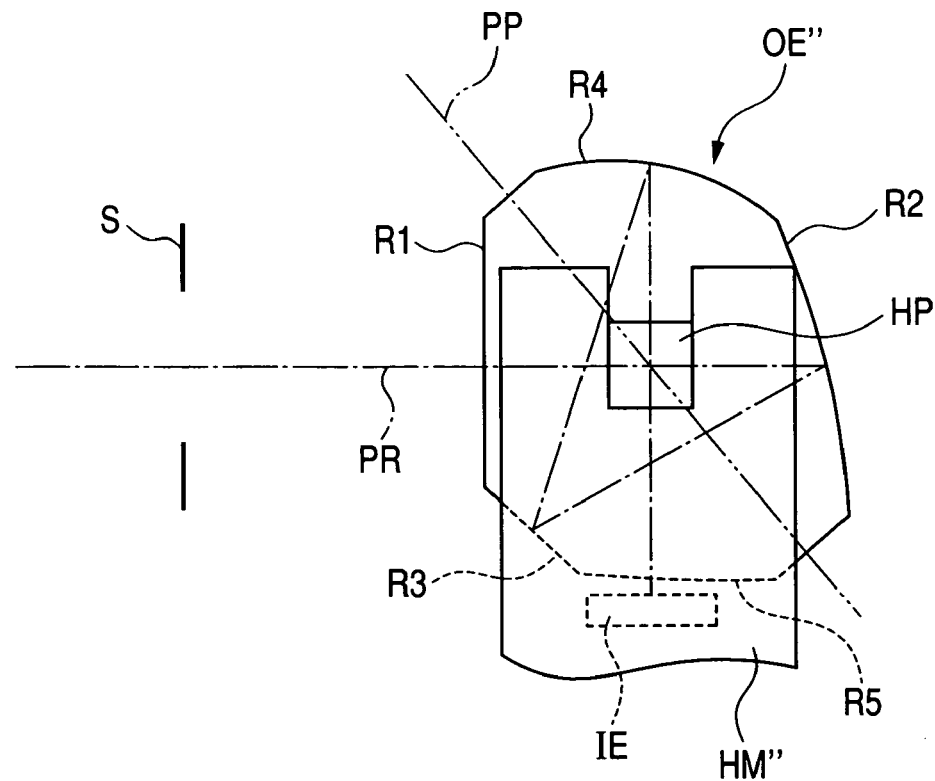
FIG. 5 is a cross sectional view that shows a configuration of an optical system that uses the modified optical element.

FIG. 5 shows an optical element OE" in which cubic projecting portions HP are provided at both ends in the X direction as in FIG. 3, and in addition, the shape of the projecting portions HP is such that a flat surface portion forms an angle of 45° with respect to the parting plane PP. FIG. 5 shows a case where the optical element OE" is used as an image pickup optical system.

Symbol HM" in FIG. 5 denotes a holding member that holds the optical element OE" by using the projecting portions HP. Further, symbol IE denotes an image pickup element (photoelectric conversion element) made from a CCD sensor, a CMOS sensor, or the like. Light from an object to be photographed (not shown) is incident to the optical element OE" from the transmitting surface R1, and is reflected by the reflecting surfaces R2 to R4. The light then is emitted from a transmitting surface R5" and is guided to the image pickup element IE. The image pickup optical system is suitable for a small-size image pickup optical system installed in a portable information terminal such as a cellular telephone.

Second Embodiment

Figure 6A:
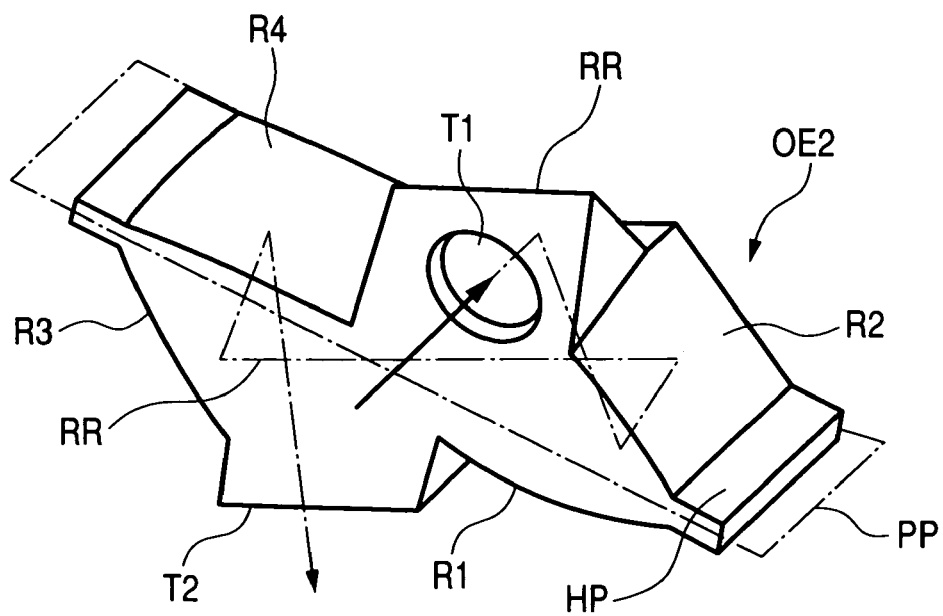
FIG. 6A is a perspective view that shows a configuration of an optical element of Second Embodiment of the present invention.
Figure 6B:
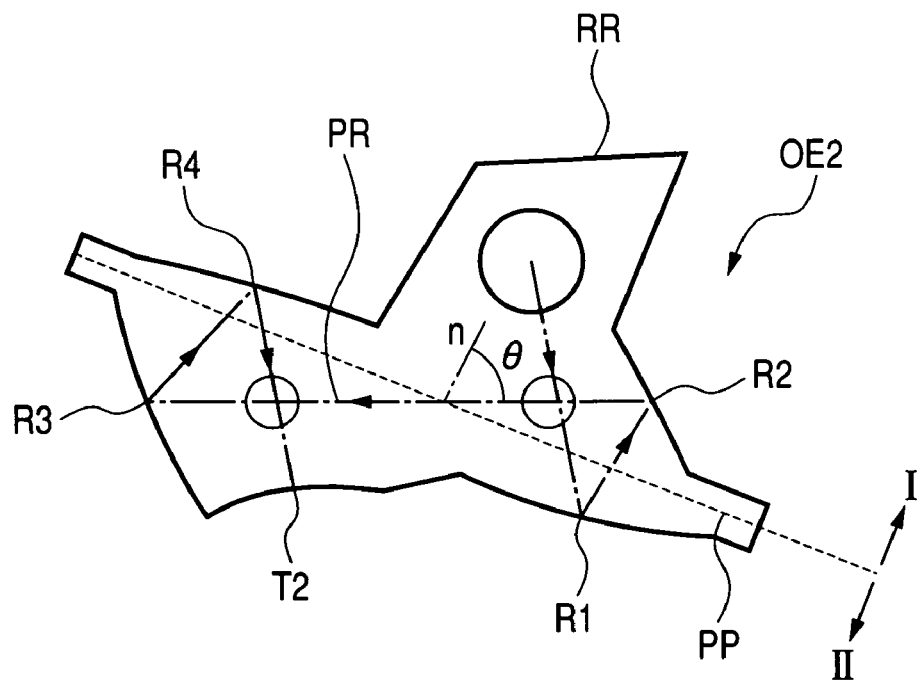
FIG. 6B is a front view that shows a configuration of the optical element of Second Embodiment.

FIGS. 6A and 6B show an optical element according to Second Embodiment of the present invention. Symbol OE2 in FIGS. 6A and 6B denotes an optical element, symbol T1 denotes an incidence surface (transmitting surface, refracting surface), symbol RR denotes a return reflecting surface, symbols R1, R2, R3, and R4 denote reflecting surfaces having curvature, and symbol T2 denotes an emission surface (transmitting surface, refracting surface).

Figure 7:
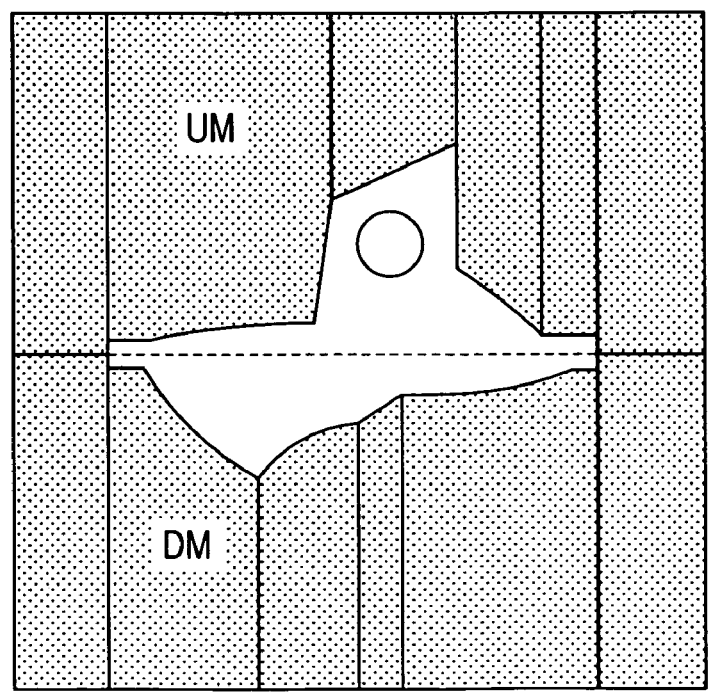
FIG. 7 is a diagram that shows an arrangement of a mold for forming the optical element of Second Embodiment.

Further, symbol PP denotes a parting plane between an upper mold UM and a lower mold DM divided as shown in FIG. 7. Symbol HP denotes projecting portions that are taken as references for holding the optical element OE2 using a holding member (not shown). The holding portions HP are provided integrally on both left and right sides of the optical element OE2 in the vicinity of the parting plane PP. It should be noted that the parting plane PP is an imaginary plane in the optical element OE2 after formation as in First Embodiment, and is defined as a plane (first plane) that passes through the two projecting portions HP provided on both sides of the optical element OE2 in this embodiment. Further, symbol PR denotes a center principal light ray.

Light flux (including the center principal light ray PR) from an object (not shown) passes through the incidence surface T1, is bent by the reflecting surface RR, and is reflected by the reflecting surfaces R1, R2, R3, and R4 in order. The light flux is then emitted from the emission surface T2.

The upper mold UM shown in FIG. 7 forms the reflecting surfaces RR, R2, and R4 of the optical element OE2, while the lower mold DM forms the reflecting surfaces R1 and R3, and the emission surface T2. It should be noted that the incidence surface T1 is formed by another mold (not shown).

In this embodiment, the center principal light ray PR crosses itself at two locations within the optical element OE2 (encircled points in FIG. 6B).

Further, with the parting plane PP taken as a boundary, an upper side region is taken as a first region I, and a lower side region is taken as a second region II, the reflecting surfaces RR, R1, R2, R3, and R4 are arranged alternately in the first region I and the second region 2 in the order in which the center principal light ray PR travels. In other words, the center principal light ray necessarily cuts across the parting plane PP when heading toward the reflecting surface R1 from the return reflecting surface RR, when heading toward the reflecting surface R2 from the reflecting surface R1, when heading toward the reflecting surface R3 from the reflecting surface R2, and when heading toward the reflecting surface R4 form the reflecting surface R3. It should be noted that, in this embodiment, the center principal light ray also cuts across the parting plane PP when heading toward the transmitting surface R5 from the reflecting surface R4.

By employing this type of optical surface arrangement, the angles between the surface normal of each of the optical surfaces and the direction in which the upper mold UM and the lower mold DM open (the direction in which the mold is divided, the Y direction in the figures) become small compared to that of a conventional optical element shown in FIG. 8 to FIG. 10, similar to First Embodiment.

Further, in this embodiment, in a right end portion of the first region I, in other words, the reflection surface R2, which is disposed in a position closest to the projecting portion HP on the right side, and a left end portion of the second region II, in other words, the reflecting surface R3, which is disposed in a position closest to the projecting portion HP on the left side (hereinafter referred to as the "endmost optical surfaces"), the spacing between one optical surface and the next optical surface becomes larger (largest). The parting plane PP is determined so that the angles between surface normals of the reflecting surfaces R2 and R3, and the direction in which the mold opens become smaller.

In other words, the angle θ formed between the normal n of the parting plane PP and the center principal light ray PR heading toward the reflecting surface R3 from the reflecting surface R2, or a straight line connecting between a surface apex point of the reflecting surface R2 and a surface apex point of the reflecting surface R3, is set to 70° or smaller, preferably 50° or smaller. It should be noted that the angle θ is set to 69.3° in this embodiment. Gradients (inclinations) of the surface normals of the reflecting surfaces R2 and R3 to the direction in which the mold opens can be made smaller.

The optical element OE2 thus configured can be used in image pickup devices (such as cameras and video cameras), in display devices (such as projectors), and in optical systems of optical devices such as observation devices (such as image pickup optical systems, projecting optical systems, and observation optical systems), as shown in FIG. 3 and FIG. 5. When thus used, the optical element OE2 is positioned and held by a holding member, through the projecting portions HP.

Further, the projecting portions HP may also be provided on both ends of sides that differ from those of FIGS. 6A and 6B.

The reflecting surfaces of the optical element OE2 of this embodiment may be reflecting surfaces that satisfy a total reflection condition, and may be formed by using a single layer reflective film or a plurality of layers of reflective films. A dielectric multi layer film may also be used to form a reflecting surface, and further, the reflecting surface may also be formed by using a metallic thin film or the like.

It should be noted that the present invention does not depend on the shape of the optical element or the number of optical surfaces. The present invention can be applied to all optical elements and optical systems made from a transparent member having two transmitting surfaces and a plurality of reflecting surfaces, in which a center principal light ray crosses itself at least once inside the transparent member. Further, the present invention can be applied to not only image pickup optical systems and observation optical systems but also an optical system used in a variety of optical devices, such as a projecting optical system used in a projector.

According to the embodiment described above, an optical element, an optical system, and an optical device can be obtained in which a requisite light path length can be secured with a compact size, and in addition, in which errors regarding the surface shape and cost increases can be suppressed.

This application claims priority from Japanese Patent Application No. 2004-108391 filed on Mar. 31, 2004, which is hereby incorporated by reference herein.

What is claimed is:

1. An optical element comprising a transparent member having: a first refracting surface; a second refracting surface; and a plurality of reflecting surfaces,
   wherein the transparent member is capable of causing light, which enters the transparent member from the first refracting surface, to be reflected at least three times by the plurality of reflecting surfaces and guided to the second refracting surface,
   wherein an optical path from the first refracting surface leading to the second refracting surface crosses itself inside the transparent member when seen from a direction that is substantially perpendicular to both incident light on the first refracting surface and light exiting from the second refracting surface,
   wherein the transparent member comprises projecting portions having no optical action provided on both sides of the transparent member, and
   wherein each one of the plurality of reflecting surfaces is located in one of a first region or a second region and reflects the incident light to another surface located in the other of the first region or the second region, the first region and the second region being regions on one and the other sides, respectively, of a first plane passing through the projecting portions provided on both sides of the transparent member which is taken as a boundary.

2. An optical element according to claim 1, wherein the incident light
   from the first refracting surface is guided to the second refracting surface after being deflected by only the plurality of reflecting surfaces.

3. An optical element according to claim 1, wherein an optical path of the
   incident light from the first refracting surface leading to the second refracting surface crosses itself.

4. An optical element according to claim 1, wherein an angle θ formed between a normal of the first plane and a straight line that connects an apex point of a first surface and an apex point of a second surface satisfies a condition of θ≦70°, the first surface being a surface, from among the two refracting surfaces and the plurality of reflecting surfaces, disposed in an endmost portion in the first region and extending in a first direction along the first plane, the second surface being a surface, from among the two refracting surfaces and the plurality of reflecting surfaces, disposed in an endmost portion in the second region and extending in a second direction that is opposite to the first direction.

5. An optical element according to claim 1, wherein the incident light is a center principal light ray that passes from the center of an object surface to the center of a pupil, and
   wherein the center principal light ray crosses itself inside the transparent member.

6. An optical element according to claim 1, wherein the optical path from the first refracting surface leading to the second refracting surface crosses itself at two locations inside the transparent member when seen from the direction that is substantially perpendicular to both incident light on the first refracting surface and light exiting from the second refracting surface.

7. An optical element according to claim 1, wherein the optical path from the first refracting surface leading to the second refracting surface crosses itself at two locations inside the transparent member.

8. An optical device comprising:
the optical element according to claim 1; and
a holding member that holds the optical system by using projecting portions.

9. An optical element according to claim 1, wherein an optical path of light incident onto the first refracting surface or an extended line of the optical path of light incident onto the first refracting surface is different from an optical path of light incident onto the second refracting surface or an extended line of the optical path of light incident onto the second refracting surface.

10. An optical element according to claim 1, wherein an optical path of light incident onto the first refracting surface or an extended line of the optical path of light incident onto the first refracting surface is inclined with respect to an optical path of light incident onto the second refracting surface or an extended line of the optical path of light incident onto the second refracting surface.

11. An optical system comprising an optical element having: a first refracting surface; a second refracting surface; and a plurality of reflecting surfaces,
wherein the optical element is configured such that a center principal light ray that passes from the center of an object plane to the center of a pupil enters the optical element from the first refracting surface, is reflected at least three times by the plurality of reflecting surfaces, and then exits from the optical element through the second refracting surface, wherein an optical path of the center principal light ray from the first refracting surface leading to the second refracting surface crosses itself inside the optical element when seen from a direction that is approximately perpendicular to both the center principal light ray incident from the first refracting surface and the center principal light ray directing to the second refracting surface,
wherein the optical element comprises projecting portions having no optical action provided on both sides of the optical element, and
wherein each one of the plurality of reflecting surfaces is located in one of a first region or a second region and reflects the center principal light ray to a surface located in the other of the first region or the second region, the first region and the second region being regions on one and the other sides, respectively, of a first plane passing through the projecting portions provided on both sides of the optical element which is taken as a boundary.

12. An optical system according to claim 11, wherein the incident light from the first refracting surface is guided to the second refracting surface after being deflected by only the plurality of reflecting surfaces.

13. An optical system according to claim 11, wherein the optical path of the center principal light ray crosses itself within the optical element.

14. An optical system according to claim 11, wherein an angle $\theta$ formed between a normal of the first plane and the center principal light ray travelling between a first surface and a second surface satisfies a condition of $\theta \leq 70°$, the first surface being a surface, from among the two refracting surfaces and the plurality of reflecting surfaces, disposed in an endmost portion in the first region and extending in a first direction along the first plane, the second surface being a surface, from among the two refracting surfaces and the plurality of reflecting surfaces, disposed in an endmost portion in the second region and extending in a second direction that is opposite to the first direction.

15. An optical system according to claim 11, wherein the optical path of the center principal light ray from the first refracting surface leading to the second refracting surface crosses itself at two locations inside the transparent member when seen from the direction.

16. An optical element according to claim 11, wherein the optical path of the center principal light ray from the first refracting surface leading to the second refracting surface crosses at two locations itself inside the transparent member.

17. An optical device comprising:
the optical system according to claim 11; and
a holding member that holds the optical system by using projecting portions.

18. An optical device according to claim 17, further comprising at least one image display element disposed at a location of the object plane;
wherein the optical system projects the light flux from the at least one image display element including the center principal light ray to a projection plane.

19. An optical element according to claim 11, wherein an optical path of light incident onto the first refracting surface or an extended line of the optical path of light incident onto the first refracting surface is different from an optical path of light incident onto the second refracting surface or an extended line of the optical path of light incident onto the second refracting surface.

20. An optical element according to claim 11, wherein an optical path of light incident onto the first refracting surface or an extended line of the optical path of light incident onto the first refracting surface is inclined with respect to an optical path of light incident onto the second refracting surface or an extended line of the optical path of light incident upon the second refracting surface.

* * * * *

UNITED STATES PATENT AND TRADEMARK OFFICE
CERTIFICATE OF CORRECTION

| | | |
|---|---|---|
| PATENT NO. | : 7,212,353 B2 | Page 1 of 1 |
| APPLICATION NO. | : 11/095067 | |
| DATED | : May 1, 2007 | |
| INVENTOR(S) | : Sunaga | |

It is certified that error appears in the above-identified patent and that said Letters Patent is hereby corrected as shown below:

Column 1, line 39, "U.S. Pat. No. 2003-063400" should read --U.S. Patent Application Pub. No. 2003-063400--; line 64, "U.S. Pat. No. 2003-063400" should read --U.S. Patent Application Pub. No. 2003-063400--.

Signed and Sealed this

Third Day of July, 2007

JON W. DUDAS
*Director of the United States Patent and Trademark Office*